United States Patent [19]

Sobottke et al.

[11] Patent Number: 5,440,574
[45] Date of Patent: Aug. 8, 1995

[54] SOLID-STATE LASER

[75] Inventors: Mark D. Sobottke, Kettering; Jamie N. Lussier, Huber Heights, both of Ohio

[73] Assignee: Spectra-Physics Laserplane, Inc., Dayton, Ohio

[21] Appl. No.: 253,072

[22] Filed: Jun. 2, 1994

[51] Int. Cl.$^6$ ............................................. H01S 3/04
[52] U.S. Cl. .................................... 372/34; 372/72;
372/101; 372/19; 372/108; 372/92
[58] Field of Search ................... 372/34, 72, 101, 19,
372/92, 108, 107

[56] References Cited

U.S. PATENT DOCUMENTS

| | | |
|---|---|---|
| 3,949,323 | 4/1976 | Bierlein et al. . |
| 3,982,201 | 9/1976 | Rosenkrantz et al. . |
| 4,035,742 | 7/1977 | Schiffner . |
| 4,272,733 | 6/1981 | Walling et al. . |
| 4,383,318 | 5/1983 | Barry et al. . |
| 4,387,297 | 6/1983 | Swartz et al. . |
| 4,413,342 | 11/1983 | Cohen et al. . |
| 4,553,238 | 11/1985 | Shaw et al. . |
| 4,617,666 | 10/1986 | Liu . |
| 4,618,957 | 10/1986 | Liu . |
| 4,637,026 | 1/1987 | Liu . |
| 4,653,056 | 3/1987 | Baer et al. . |
| 4,656,635 | 4/1987 | Baer et al. . |
| 4,665,529 | 5/1987 | Baer et al. . |
| 4,701,929 | 10/1987 | Baer et al. . |
| 4,723,257 | 2/1988 | Baer et al. . |
| 4,730,335 | 3/1988 | Clark et al. . |
| 4,731,787 | 3/1988 | Fan et al. . |
| 4,731,795 | 3/1988 | Clark et al. ................ 372/107 |
| 4,739,507 | 4/1988 | Byer et al. . |
| 4,756,003 | 8/1988 | Baer et al. . |
| 4,761,786 | 9/1988 | Baer . |
| 4,884,281 | 11/1989 | Hawthorn et al. . |
| 4,993,801 | 2/1991 | Sarraf ................................. 372/36 |
| 5,068,865 | 11/1991 | Ohshima et al. ................ 372/36 |
| 5,128,798 | 7/1992 | Bowen et al. . |
| 5,164,947 | 11/1992 | Lukas et al. . |
| 5,255,015 | 10/1993 | Noethen et al. ..................... 372/34 |

OTHER PUBLICATIONS

Culshaw et al, "Efficient Frequency-Doubled Single-Frequency Nd: YAG Laser", *IEEE Journal of Quantum Electronics*, vol. QE-10, No. 2, Feb. 1974, pp. 253-263.

Smith, Richard G., "Theory of Interactivity Optical Second-Harmonic Generation", *IEEE Journal of Quantum Electronics*, vol. Qe-6, No. 4, Apr. 1970, pp. 215-223.

(List continued on next page.)

*Primary Examiner*—Leon Scott, Jr.
*Attorney, Agent, or Firm*—Killworth, Gottman, Hagan & Schaeff

[57] ABSTRACT

A solid-state laser for generating harmonic laser light substantially at a desired wavelength has a pump diode body made of a first material, which is preferably aluminum, having a first coefficient of expansion and a laser diode mounted in the pump diode body for generating pump energy. A laser body assembly, which is positioned on the pump diode body, is made of a second material, which is preferably steel, having a second coefficient of expansion. The first and second coefficients of expansion of the respective pump diode body and the laser body assembly have a known relationship such that the laser cavity expands and contracts at a particular rate as the temperature of the laser increases and decreases to provide a substantially constant generation of the harmonic laser light. A laser gain chip mounted on an entrance mirror, which forms the back end of a laser cavity, generates fundamental laser light in response to pump energy from the laser diode. The fundamental laser light passes through an active etalon output mirror into a frequency doubler chip which doubles the frequency thereof to produce harmonic laser light. A mirrored surface, which forms a front end of the laser cavity, permits a portion of the harmonic laser light to be emitted from the laser and reflects the remaining portion of the harmonic laser light back to the active etalon output mirror. A control etalon may be provided to suppress undesired light wavelengths in the laser cavity.

20 Claims, 1 Drawing Sheet

OTHER PUBLICATIONS

Yarborough et al, "Enhancement of Optical Second Harmonic Generation by Utilizing the Dispersion of Air", *Applied Physics Letters*, vol. 18, No. 3, Feb. 1, 1971, pp. 70–73.

Oka et al, "Stable intracavity doubling of orthogonal lineraly polarized modes in diode-pumped ND: YAG Lasers", *Optics Letters*, vol. 13, No. 10, Oct. 1988, pp. 805–807.

James et al, "Intermittency and chaos in intracavity doubled lasers", *Physical Review A*, vol. 41, No. 5, Mar. 1, 1990, pp. 2778–2790.

Chinn et al, "Low-Threshold, Transversely Excited NdP5O14 Laser", *IEEE Journal of Quantum Electronics*, Sep. 1975, pp. 747–754.

Budin et al, "On the Design of Neodymium Miniature Lasers", *IEEE Journal of Quantum Electronics*, vol. QE-14, No. 11, Nov. 1978, pp. 831–839.

Budin et al, "Miniature Nd-pentaphosphate laser with bonded mirrors side pumped with low-current density LED's", *Appl. Phys. Lett.* 33(4), Aug. 15, 1978, pp. 309–310.

Kubodera et al, "Stable LiNdP4O12 miniature laser", *Applied Optics*, vol. 18, No. 6, Mar. 15, 1979, pp. 884–890.

Weber et al, "Nd-ultraphosphate laser", *Appl. Phys. Letters*, vol. 22, No. 15, May 15, 1973, pp. 534–536.

Owyoung et al, "Gain switching of a monolithic single-frequency laser-diode-excited Nd: YAG laser", *Optics Letters*, vol. 10, No. 10, Oct. 1985, pp. 484–486.

Kubodera et al, "Spike-Mode Oscillations in Laser-Diode Pumped LiNdP4O12 Lasers", *IEEE Journal of Quantum Electronics*, vol. QE-17, No. 6, Jun. 1981, pp. 1139–1144.

Chinn, S. R., "Intracavity second-harmonic generation in a Nd pentaphosphate laser", *Appl. Phys. Lett.*, vol. 29, No. 3, Aug. 1, 1976, pp. 176–179.

Chesler et al, "Miniature diode-pumped Nd: YlAG lasers", *Appl. Phys. Lett.*, vol. 23, No. 5, Sep. 1, 1973, pp. 236–236.

Barnes, "Diode-pumped solid-state lasers", *J. Appl. Phys.*, vol. 44, No. 1, Jan. 1, 1973, pp. 230–237.

Ostermayer, Jr., "GaAs1-zPz Diode Pumped YAG:Nd lasers", *Appl. Phys. Lett.*, vol. 18, No. 3, Feb. 1, 1971, pp. 93–96.

Allen et al, "Continuous Operation of a YAG:Nd Laser by Injection Luminescent Pumping", *Appl. Phys. Lett.*, vol. 14. No. 6, Mar. 15, 1969, pp. 188–190.

Schmitt et al, "Diode-laser-pumped Nd:YAG laser injection seeding system", *Applied Optics*, vol. 25, No. 5, Mar. 1, 1986, pp. 629–633.

Baer, T., "Diode Laser Pumping of Solid-State Lasers", Reprint from *Laser Focus*, Jun. 1986.

Farmer et al, "Solid State Pumping Source for Nd:YAG Lasers with Integrated Focusing Optics", IBM Technical Disclosure Bulletin, vol. 15, No. 1, Jun. 1972, pp. 149–150.

Semiconductor Laser Specification Sheet, Toshiba Corporation, Feb. 9, 1987, 5 pages.

Data Sheet MOM-MM-163, "Cargille Meltmounts for Microscopy", Cargille Laboratories, Inc., Jan. 1, 1987, 2 pages.

Announcement Sheet, "CFE4 Spectroscopic properties and lasing of ND:GdVO4 pumped by a diode laser and a Ti:sapphire", Announced Feb. 1993.

Sorokin et al, "CW passive mode-locking of a new ND3+:GdVo4 laser", ATuC2-1, Feb. 1993, pp. 203–205.

Ostroumov et al, "Nd:GdVO4 Crystal—a New Material for Diode-Pumped Solid-State Lasers", AMC1-1, Feb. 1993, pp. 52–54.

SOLID-STATE LASER

BACKGROUND OF THE INVENTION

The present invention relates generally to a solid-state laser and, more particularly, to a solid-state laser which compensates for temperature fluctuations and which is easily and inexpensively manufactured.

Solid-state lasers which generate a visible laser beam are used extensively in the construction and agricultural industries for surveying, measurement and equipment control. Consequently, manufacturers are continually attempting to develop more reliable and less expensive lasers.

Laser malfunctions are commonly caused by temperature fluctuations of the laser cavity. The heat generated during conventional laser operation may cause thermally induced elongation of the laser cavity. Previous laser designs have addressed this problem through the use of materials having a low coefficient of thermal expansion, such as Invar, quartz and various ceramics, and also by providing external temperature control to thermally stabilize the laser cavity.

U.S. Pat. No. 4,731,795 issued to Clark et al. discloses an optically pumped solid-state laser wherein the various laser components are positioned in a two-piece, tubular support structure. The tubular support structure has indentations which receive the various laser components and arrange the components along an optical path. The tubular support structure is composed of a rigid material, such as metals, ceramics, glass, thermoplastic materials and thermosetting materials. A preferred material from which to fabricate the support structure is die cast aluminum.

Another solid-state laser design is disclosed in U.S. Pat. No. 4,730,335 also issued to Clark et al. This solid-state laser includes a plurality of fittings having one or more laser components mounted therein. The fittings are constructed in such a manner that the components are aligned with respect to one another along an optical axis upon joining the fittings together.

Each of the Clark et al. lasers is fabricated from a single material. If the laser cavity is manufactured from a material having a low coefficient of expansion, temperature fluctuations have a negligible effect on the length of the laser cavity. Although a laser cavity fabricated from a material having a high coefficient of expansion would expand and contract with temperature fluctuations, the Clark et al. lasers are comprised of a single material and, therefore, every component mounted within the laser is displaced a substantially proportional amount. However, problems exist in situations which ideally require nonuniform displacement of the components to maintain a uniform laser beam. For instance, it may be desired that the pump diode maintain a constant relationship with the laser cavity as the laser cavity expands and contracts.

In addition, prior lasers have used laser mirrors having a ground and polished glass substrate. The glass substrates need to be finely ground and highly polished to reduce losses in the laser. Unfortunately, laser mirrors having such glass substrates are relatively expensive and, therefore, comprise a substantial portion of the cost of prior lasers.

Accordingly, there is a need in the art for a solid-state laser which compensates for temperature fluctuations of the laser and which is easily and inexpensively manufactured.

SUMMARY OF THE INVENTION

The present invention meets the aforementioned need by providing a solid-state laser which compensates for temperature fluctuations resulting from the laser operation, which requires less expensive materials and which may be inexpensively manufactured. The solid-state laser according to the present invention includes a pump diode body and resonant cavity body comprised of dissimilar materials which expand and contract at different rates to maintain the relationship between the length of the laser cavity and the laser light reflected therein. In addition, relatively inexpensive drawn glass microsheet is used as laser mirror substrates and for mounting glass.

In accordance with one aspect of the present invention, a solid-state laser is provided for generating harmonic laser light substantially at a desired wavelength. The laser includes a pump diode body made of a first material, which is preferably aluminum, having a first coefficient of expansion and a laser diode mounted in the pump diode body for generating pump energy. A laser cavity assembly defines a laser cavity such that the pump energy enters the laser cavity. A laser generator is positioned in the laser cavity for generating the harmonic laser light in response to the pump energy.

A laser body assembly is mounted on the pump diode body for supporting the laser cavity assembly and for enclosing the laser generator. The laser body assembly is made of at least a second material, which is preferably steel, having a second coefficient of expansion. The first and second coefficients of expansion of the respective pump diode body and the laser body assembly have a known relationship such that the laser cavity expands and contracts as the temperature of the laser generator increases and decreases to provide a substantially constant generation of the harmonic laser light.

Preferably, the laser diode is thermally bonded to the pump diode body with a coupling material, such as silver filled epoxy. A pump lens assembly may be positioned in the pump diode body for focusing the pump energy into the laser generator. The pump lens assembly comprises a plano-convex lens mounted on the laser diode for focusing the pump energy and a ball lens mounted in the pump diode body for receiving the pump energy from the plano-convex lens and for focusing the pump energy into the laser generator.

The laser cavity assembly may include an entrance mirror forming a back end of the laser cavity and output coupler including a mirrored surface forming a front end of the laser cavity. A mounting glass may be interposed between the entrance mirror and the pump diode body. The output coupler may comprise a control etalon for suppressing laser light having wavelengths other than the wavelengths of the fundamental laser light and the harmonic laser light.

The laser body assembly may include a resonant cavity body mounted on the pump diode body for supporting the entrance mirror and the laser generator and an output coupler body mounted on the resonant cavity body for supporting the output coupler. An adjustment may be included in the resonant cavity body which is deformed to position the mirrored surface of the output coupler to align the laser cavity.

Preferably, the laser generator comprises a laser gain chip of lasing material, a frequency multiplier chip and an active etalon output mirror. The laser gain chip generates fundamental laser light in response to the pump energy and transmits the fundamental laser light to the frequency multiplier chip. The frequency multiplier chip changes the frequency of the fundamental laser light to produce the harmonic laser light at the desired wavelength. The active etalon output mirror is interposed between the laser gain chip and the frequency multiplier chip for reflecting at least a portion of the pump energy which passes through the laser gain chip and for reflecting a portion of the fundamental laser light emitted from the laser gain chip back into the laser gain chip.

In accordance with another aspect of the present invention, a solid-state laser for generating harmonic laser light substantially at a desired wavelength is provided. The laser includes a pump diode body, a laser diode mounted in the pump diode body for generating pump energy and a laser cavity assembly positioned to receive the pump energy. The laser cavity assembly defines a laser cavity and includes an entrance mirror for forming a back end of the laser cavity. The entrance mirror has a mirror substrate comprised of drawn glass microsheet. The laser cavity assembly further includes output coupler including a mirrored surface forming a front end of the laser cavity. The laser generator is positioned in the laser cavity for generating the harmonic laser light in response to the pump energy.

Preferably, the laser generator comprises a laser gain chip for generating fundamental laser light in response to the pump energy and a frequency multiplier chip for changing the frequency of the fundamental laser light to produce the harmonic laser light. The laser generator may also include an active etalon output mirror interposed between the laser gain chip and the frequency multiplier chip for reflecting at least a portion of the pump energy which passes through the laser gain chip back into the laser gain chip and for reflecting at least a portion of the fundamental laser light back into the laser gain chip.

DETAILED DESCRIPTION OF THE INVENTION

Figure 1:
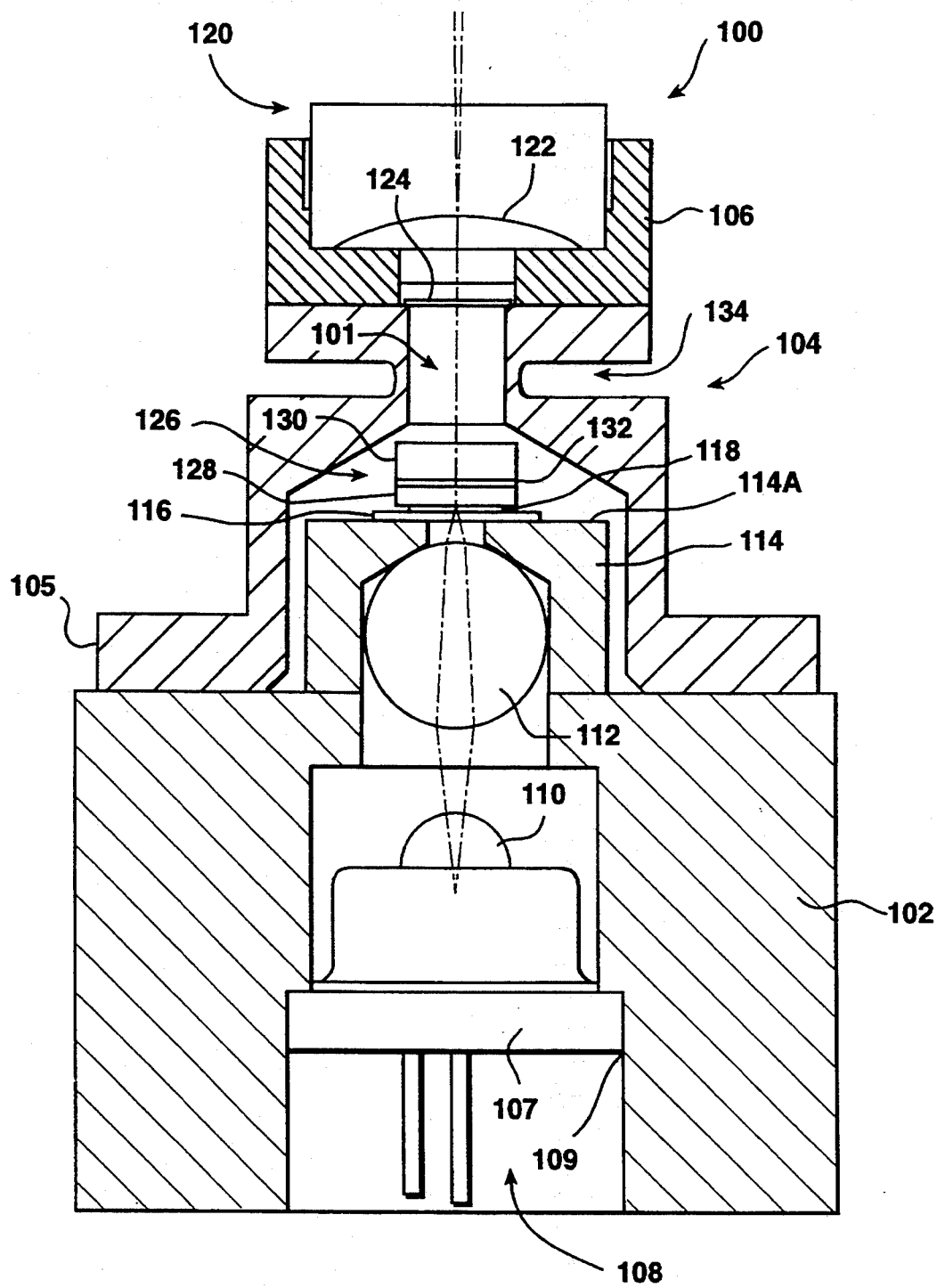
FIG. 1 is a cross sectional view of a solid-state laser in accordance with the present invention.

A solid-state laser 100 having a single laser cavity 101 for generating harmonic laser light substantially at a desired wavelength in accordance with the present invention is shown in cross-section in FIG. 1. The laser 100 includes a pump diode body 102 and a laser body assembly 104 comprised of a resonant cavity body 105 and an output coupler body 106.

In order to compensate for temperature fluctuations during laser operation, the pump diode body 102 and the resonant cavity body 105 are fabricated from dissimilar materials having different coefficients of expansion. Preferably, the pump diode body 102 and the resonant cavity body 105 are fabricated from aluminum and steel, respectively. However, as those skilled in the art will readily comprehend, the pump diode body 102 and the resonant cavity body 105 may be fabricated from various composite materials having different coefficients of expansion. For example, a polycarbonate material having a glass filler may be advantageously employed. The amount of glass filler can be varied to provide different coefficients of expansion.

The coefficients of expansion of the two materials are selected such that the laser cavity 101 expands and contracts to compensate for changes in wavelength caused by the aforesaid temperature fluctuations. In addition, the output coupler body 104 may be fabricated from a third material which further expands and contracts to compensate for the temperature fluctuations. By varying the length of the laser cavity 101, the proper relationship between the various wavetrains of light arising from intracavity reflections in the laser cavity 101 can be maintained and, thereby, reduce the possibility of destructive interference within the laser cavity 101 via maintenance of reflective boundary relationships.

A laser diode 107 for generating pump energy is mounted in a cavity 108 formed in the pump diode body 102. Preferably, a coupling material 109, such as silver filled epoxy, thermally bonds the laser diode 107 to the pump diode body 102 whereby heat may be conducted from the laser diode 107 to the pump diode body 102 to assist in cooling the laser diode 107. A plano-convex lens 110 is mounted on the laser diode 107 for focusing the pump energy.

A ball lens 112 aligned to receive the pump energy emerging from the plano-convex lens 110 further focuses the pump energy. The ball lens 112 is mounted within a pump body pedestal 114 formed in the pump diode body 102 which greatly facilitates assembly of the laser 100. During assembly, the ball lens 112 is inserted into the pedestal 114 and a suitable adhesive is applied thereto. Preferably, an optical adhesive is used to securely mount the ball lens 112 in the pedestal 114. The plano-convex lens 110 and the ball lens 112 form a pump lens assembly for focusing the pump energy.

The pump energy emerges from the ball lens 112 and enters a mounting glass 116 mounted on a pedestal surface 114A of the pedestal 114 of the pump diode body 102. The mounting glass 116 is preferably fabricated from drawn glass microsheet. Upon traversing the mounting glass 116, the pump energy enters an entrance mirror 118 which forms a back end of the laser cavity 101. The entrance mirror 118 is shown contiguous to the mounting glass 116; however, the entrance mirror 118 may be mounted in any suitable position whereby the pump energy is received. Preferably, the mirror substrate of the entrance mirror 118 is fabricated from drawn glass microsheet, such as Corning #1 microscope cover glass. Using drawn glass microsheet as mirror substrates and mounting glass provides a significant cost savings over prior lasers which use relatively expensive polished and ground glass.

The laser cavity assembly which defines the laser cavity 101 includes the entrance mirror 118 for forming the back end of the laser cavity 101 and output coupler 120 having a mirrored surface 122 for forming the front end of the laser cavity 101. The output coupler 120 may include a control etalon 124, which may have a substrate comprised of drawn glass microsheet, to suppress undesired wavelengths of light which may be present in the laser cavity 101.

A laser generator 126 for generating harmonic laser light in response to the pump energy is interposed between the front and back ends of the laser cavity 101. The laser generator 126 includes a laser gain chip 128 of lasing material, a frequency multiplier chip, such as frequency doubler chip 130 and an active etalon output mirror 132, which preferably has a substrate comprised of drawn glass microsheet, interposed between the laser gain chip 128 and the frequency multiplier chip 130. The laser gain chip 128 is mounted on the entrance mirror 118 and lases to generate fundamental laser light in response to the pump energy. The fundamental laser light passes through the active etalon output mirror 132 and is converted into harmonic laser light by the frequency doubler chip 130. A detailed description of the operation of an exemplary laser generator including an active etalon output mirror is disclosed in U.S. patent application Ser. No. 08/252,949, entitled "SOLID-STATE LASER WITH ACTIVE ETALON AND METHOD THEREFOR" (attorney's docket number SPC 187 PA) by Klemer et al., concurrently filed herewith, the disclosure of which is hereby incorporated by reference.

One or more coupling materials are used to bond the respective laser elements to one another. Preferably, the coupling materials have refractive indices matched to the joined elements to substantially reduce reflections at the bonded surfaces of the elements. As will be readily appreciated by those skilled in the art, the laser generator 126 may have a configuration which departs from the configuration described above. For example, the laser gain chip and frequency coupler chip may directly bonded to one another, as is disclosed in commonly assigned U.S. Pat. No. 4,884,281 issued to Hawthorn et al.

The laser cavity assembly, the mounting glass 116 and laser generator 126 are mounted in the resonant cavity body 105. Resonant cavity body 105 includes an adjustment device, shown as circumferential groove 134, which may be deformed to position the mirrored surface 122 of the output coupler 120 to align the laser cavity 101 for lasing. In addition, the orientation of the entrance mirror 118, and thus laser generator 126, can be adjusted by altering the slope of the pedestal surface 114A to properly align the emitted laser light.

Operation of the laser 100 will now be described in detail. The pump energy generated by the laser diode 106 preferably consists of light having wavelengths around 800 nm for common lasing materials incorporating neodymium with the specific wavelength being dependent upon the lasing material used. A number of readily available laser diodes which emit suitable pump energy may be advantageously employed in the laser 100, such as the LT017MD sold by Sharp Corporation. The pump energy enters the laser gain chip 128 through the entrance mirror 118. The entrance mirror 118 is highly transmissive to the pump energy having a wavelength of about 800 nm and is highly reflective of light having a wavelength of about 1050 nm.

The laser gain chip 128 may preferably comprise neodymium-doped gadolinium vanadate (Nd:GdVO$_4$), as is disclosed in U.S. patent application Ser. No. 08/252,947, entitled "GADOLINIUM VANADATE LASER" (attorney's docket number SPC 226 PA), by Lussier et al., concurrently filed herewith, the disclosure of which is hereby incorporated by reference. The Nd:GdVO$_4$ laser gain chip lases to generate infrared light near a fundamental wavelength of 1063 nm.

A laser gain chip comprised of lithium neodymium tetraphosphate (LNP) which lases to generate infrared light near a wavelength of 1050 nm may also be advantageously employed in the laser 100. The remainder of the discussion of the laser 100 operation will assume a laser gain chip of LNP. As will be readily apparent to those skilled in the art, the components of the laser 100 may be easily modified to operate with other laser materials which emit light having other wavelengths.

The pump energy thus traverses the mounting glass 116 and the entrance mirror 118 and enters the laser gain chip 128 which emits a fundamental laser light at a wavelength of approximately 1050 nm in response thereto. A portion of the pump energy passes through the laser gain chip 116 and is reflected back into the laser gain chip 116 by the active etalon output mirror 132. The active etalon output mirror 132 is highly reflective to the pump energy (near 800 nm), is partially reflective to the fundamental laser light (near 1050 nm) and is highly reflective of harmonic laser light having a wavelength of near 525 nm. As should be apparent, the harmonic laser light is substantially in the green portion of the optical spectrum.

The fundamental laser light at near 1050 nm emitted from the laser gain chip 128 traverses the active etalon output mirror 132 and enters the frequency doubler chip 130. The frequency doubler chip 130 doubles the frequency of the fundamental laser light to thereby halve its wavelength. If the fundamental laser light at near 1050 generated by the laser gain chip 128 of LNP is frequency doubled by the frequency doubler chip, which may be fabricated from potassium titanyl phosphate (KTP), the resulting harmonic laser light has a wavelength of near 525 nm and is substantially in the green portion of the optical spectrum.

A portion of the fundamental laser light and substantially all of the generated harmonic laser light is emitted from the frequency doubler chip 130. Preferably, a control etalon 124 is positioned in the laser cavity 101 to filter light having undesired wavelengths. For example, it is well known that many laser gain chips emit fundamental laser light having a plurality of wavelengths in response to pump energy. The control etalon 124 filters the undesired wavelengths such that they are removed from the laser cavity 101. The control etalon 124 is, however, highly transmissive to the fundamental and harmonic laser lights.

The mirrored surface 122 of the output coupler 120 is partially reflective of the harmonic laser light (525 nm) and highly reflective of the fundamental laser light (1050 nm). Consequently, a portion of the harmonic laser light passes through the mirrored surface 122 and is emitted by the laser 100. The remaining portion of the harmonic laser light and substantially all of the fundamental laser light is reflected by the mirrored surface 122 to the active etalon output mirror 132 passing through the frequency doubler chip 130. Repeated passes result in additional fundamental laser light (1050 nm) being converted into harmonic laser light (525 nm).

Having thus described the invention in detail by way of reference to preferred embodiments thereof, it will be apparent that other modifications and variations are possible without departing from the scope of the invention defined in the appended claims.

What is claimed is:

1. A solid-state laser for generating harmonic laser light substantially at a desired wavelength, said laser comprising:

a pump diode body made of a first material having a first coefficient of expansion;

a laser diode mounted in said pump diode body for generating pump energy;

a laser cavity assembly which defines a laser cavity positioned such that said pump energy enters said laser cavity;

a laser generator positioned in said laser cavity for generating said harmonic laser light in response to said pump energy; and a laser body assembly mounted on said pump diode body for supporting said laser cavity assembly and for enclosing said laser generator, said laser body assembly made of at least a second material having a second coefficient of expansion, said first and second coefficients of expansion having a known relationship such that said laser cavity expands and contracts as the temperature of said laser generator increases and decreases to provide a substantially constant generation of said harmonic laser light.

2. The solid-state laser as recited in claim 1 wherein said first material is aluminum.

3. The solid-state laser as recited in claim 2 wherein said second material is steel.

4. The solid-state laser as recited in claim 1 comprising coupling material for thermally bonding said laser diode to said pump diode body.

5. The solid-state laser as recited in claim 4 wherein said coupling material is silver filled epoxy.

6. The solid-state laser as recited in claim 1 comprising a pump lens assembly positioned in said pump diode body for focusing said pump energy into said laser generator.

7. The solid-state laser as recited in claim 6 wherein said pump lens assembly comprises:

a plano-convex lens mounted on said laser diode for focusing said pump energy; and a ball lens mounted in said pump diode body for receiving said pump energy from said plano-convex lens and for focusing said pump energy into said laser generator.

8. The solid-state laser as recited in claim 1 wherein said laser cavity assembly comprises:

an entrance mirror forming a back end of said laser cavity; and an output coupler including a mirrored surface forming a front end of said laser cavity.

9. The solid-state laser as recited in claim 8 wherein said output coupler comprises a control etalon for suppressing laser light having wavelengths other than the wavelengths of said fundamental laser light and said harmonic laser light.

10. The solid-state laser as recited in claim 8 comprising a mounting glass interposed between said entrance mirror and said pump diode body.

11. The solid-state laser as recited in claim 8 wherein said laser body assembly comprises:

a resonant cavity body mounted on said pump diode body for supporting said entrance mirror and said laser generator; and an output coupler body mounted on said resonant cavity body for supporting said output coupler.

12. The solid-state laser as recited in claim 11 wherein said resonant cavity body includes an adjustment device which may be deformed to position said mirrored surface of said output coupler to align said laser cavity.

13. The solid-state laser as recited in claim 1 wherein said laser generator comprises:

a laser gain chip of lasing material for generating fundamental laser light in response to said pump energy;

a frequency multiplier chip for changing the frequency of said fundamental laser light to produce said harmonic laser light at said desired wavelength; and an active etalon output mirror interposed between said laser gain chip and said frequency multiplier chip for reflecting at least a portion of said pump energy which passes through said laser gain chip and for reflecting a portion of said fundamental laser light emitted from said laser gain chip back into said laser gain chip.

14. A solid-state laser for generating harmonic laser light substantially at a desired wavelength, said laser comprising:

a pump diode body;

a laser diode mounted in said pump diode body for generating pump energy;

a laser cavity assembly which defines a laser cavity positioned to receive said pump energy, said laser cavity assembly including an entrance mirror for forming a back end of said laser cavity, said entrance mirror having a mirror substrate comprised of drawn glass microsheet, and an output coupler including a mirrored surface forming a front end of said laser cavity; and a laser generator positioned in said laser cavity for generating said harmonic laser light in response to said pump energy.

15. The solid-state laser as recited in claim 14 wherein said laser generator comprises:

a laser gain chip for generating fundamental laser light in response to said pump energy; and a frequency multiplier chip for changing the frequency of said fundamental laser light to produce said harmonic laser light.

16. The solid-state laser as recited in claim 15 wherein said laser generator includes an active etalon output mirror interposed between said laser gain chip and said frequency multiplier chip for reflecting at least a portion of said pump energy which passes through said laser gain chip back into said laser gain chip and for reflecting at least a portion of said fundamental laser light back into said laser gain chip.

17. The solid-state laser as recited in claim 16 wherein said active etalon output mirror has a mirror substrate comprised of drawn glass microsheet.

18. The solid-state laser as recited in claim 14 wherein said output coupler comprises a control etalon for suppressing laser light having wavelengths other than the wavelengths of said fundamental laser light and said harmonic laser light.

19. The solid-state laser as recited in claim 18 wherein said control etalon has a mirror substrate comprised of drawn glass microsheet.

20. The solid-state laser as recited in claim 14 comprising a mounting glass interposed between said laser generator and said pump diode body for mounting said laser generator, said mounting glass being comprised of drawn glass microsheet.

* * * * *